(12) United States Patent
Teichmann et al.

(10) Patent No.: US 8,627,321 B2
(45) Date of Patent: Jan. 7, 2014

(54) REPOSITORY OF BACKGROUND JOB TEMPLATES

(75) Inventors: Jan Teichmann, Neustadt (DE); Andreas Wolber, Heidelberg (DE); Jens Berger, Dresden (DE); Bare Said, Sankt Leon-Rot (DE)

(73) Assignee: SAP AG, Walldorf (DE)

( * ) Notice: Subject to any disclaimer, the term of this patent is extended or adjusted under 35 U.S.C. 154(b) by 404 days.

(21) Appl. No.: 12/871,698

(22) Filed: Aug. 30, 2010

(65) Prior Publication Data
US 2012/0054754 A1 Mar. 1, 2012

(51) Int. Cl.
*G06F 9/46* (2006.01)
*G06F 7/00* (2006.01)

(52) U.S. Cl.
USPC ............................ 718/102; 718/104; 707/606

(58) Field of Classification Search
None
See application file for complete search history.

(56) References Cited

U.S. PATENT DOCUMENTS

| 5,862,337 | A  | * | 1/1999  | Gray ............................. | 709/224 |
| 6,834,386 | B1 | * | 12/2004 | Douceur et al. .............. | 718/107 |
| 8,126,840 | B2 | * | 2/2012  | Davis ............................ | 707/608 |
| 2007/0157192 | A1 | * | 7/2007 | Hoefler et al. ................ | 717/168 |

* cited by examiner

*Primary Examiner* — Camquy Truong
(74) *Attorney, Agent, or Firm* — Mintz Levin Cohn Ferris Glovsky and Popeo, P.C.

(57) ABSTRACT

Aspects of the current subject matter can provide a background job repository that stores a background job template specifying a background job comprising a maintenance task that affects a customized software platform. The background job template can also include metadata defining a purpose of the background job, triggering information indicating when the background job should be executed, and a prerequisite feature of the customized software platform that indicates a need for the background job in the customized software platform. A previous set of background jobs that run in the customized software platform can be updated to a current set by comparing the previous set with the background job template and including the background job in the current set of background jobs when the customized software platform includes the prerequisite feature.

20 Claims, 4 Drawing Sheets

REPOSITORY OF BACKGROUND JOB TEMPLATES

TECHNICAL FIELD

The subject matter described herein relates to the use of a background job repository, such as for example a background job repository that stores information pertaining to maintenance tasks in a customized software platform.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, an ERP software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

In a software delivery configuration in which services provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

In currently available software delivery approaches, a system administrator can schedule batch jobs that handle a range of activities, potentially including but not limited to system data clean up, error detection, monitoring, and the like. These jobs are typically scheduled manually based on some guidelines, such as for example manuals, documentation, standard operating procedures, and the like, as well as at least in some part on the administrator's own experience and "gut feeling." Such an approach can introduce several challenges. As one example, scheduling background jobs can require a relatively high level of sophistication, such as for example an understanding of technical details of the operations of an on-demand system by those initiating and/or specifying such background jobs. In a customized software application, such as for example those delivered as part of an ERP package, not every background job is likely to be required by or even appropriate for all customizations of the application.

SUMMARY

In one aspect, a computer-implemented method includes storing a background job template in a background job repository accessible from an application server. The background job template specifies a background job that includes a maintenance task executable by a customized software platform provided from the application server. The background job template also includes metadata defining a purpose of the background job, triggering information indicating when the background job should be executed, and at least one prerequisite feature of the customized software platform that indicates a need for the background job in the customized software platform. A current set of background jobs that run in the customized software platform is updated, at least by comparing a previous set of background jobs executing in the customized software platform with the background job template and including the background job in the current set of background jobs when the customized software platform includes the at least one prerequisite feature. The background job is executed in the customized software platform according to the triggering information in the background job template.

In some variations, one or more of the following can optionally be included. As part of an new software installation or a change to an existing software installation at the application server, at least one of a second background job template and a change to the background job template can be received, for example at the application server. The second background job template can be stored in the background job repository and/or the change can be made to the background job template in the background job repository. The customized software platform can be periodically monitored to determine whether changes to the customized software platform have resulted in the customized software platform no longer having the prerequisite feature or have resulted in the customized software platform having a second prerequisite feature of a second background job template specifying a second background job that is not part of the current set. If the customized software platform no longer has the prerequisite feature, the background job can be removed from the current set, and the second background job can be added to the current set if the customized software platform has the second prerequisite feature.

The customized software platform can be provided via a client tenant of a plurality of client tenants of a multi-tenant software architecture implemented on the application server. The application server can be accessible over a network from a plurality of organizations that are each provided access to one of the plurality of client tenants. At least one of the plurality of client tenants can include different functionality than the customized software platform. The application server can access at least one data repository that includes core software platform content relating to the operation of the multi-tenant software architecture, system content that includes data objects created in runtime by the multi-tenant software architecture that are modifiable with data provided by a corresponding tenant, and tenant-specific content including data objects or extensions to data objects that are customized for a corresponding tenant. The core software content can be common to all of the plurality of tenants and unmodifiable by users at the organizations. Data objects or extensions to data objects of a particular tenant are not available to other tenants. The prerequisite feature can include at least one of a first attribute of the core software platform, a second attribute of a specific client tenant of the plurality of client tenants, and a tenant-specific scope of functionality provided to the organization by a specific client tenant of the plurality of client tenants.

The background job template can include an execution step for the background job as well as an execution schedule and an execution term for the background job. A new background job template can be received for addition to the background job repository. The receiving can be associated with an installation of new functionality in the customized software platform or with an update or upgrade to the customized software platform. The current set of background jobs running in the customized software platform can be updated to a new current set of background jobs running in the customized software platform such that the new set includes a new background job defined by the new template if the customized software platform includes a new prerequisite feature that the new background job template includes.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The subject matter described herein provides many advantages including, but not limited to, reducing the dependence of background job scheduling on subjective factors and static, "one-size-fits all" procedures while ensuring that background jobs can be scheduled in a convenient and automated manner while still being intelligently applied. Further benefits can be realized in multi-tenant systems in which multiple customized versions of a core software platform can be provided from a single application server to multiple organizations. In such an arrangement, maintenance of a current set of background jobs that are appropriate and necessary to support the functionality provided by each client tenant can be very complicated. The current subject matter can readily be extended to address such issues. Additionally, to support ongoing maintenance, upgrades, and updates to a system that can require modifications of the tasks, prerequisite features, dependencies, and the like of background jobs or the creation of new background jobs, background job templates can be developed or modified and included as part of a new or updated software package. The new or modified background job templates can be added to a job repository at the software installation site (i.e. a local installation for a standalone system or as part of the roll-out for a multi-tenant system) and from there can be used to create a current set of background jobs for each instance of a customized software platform.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
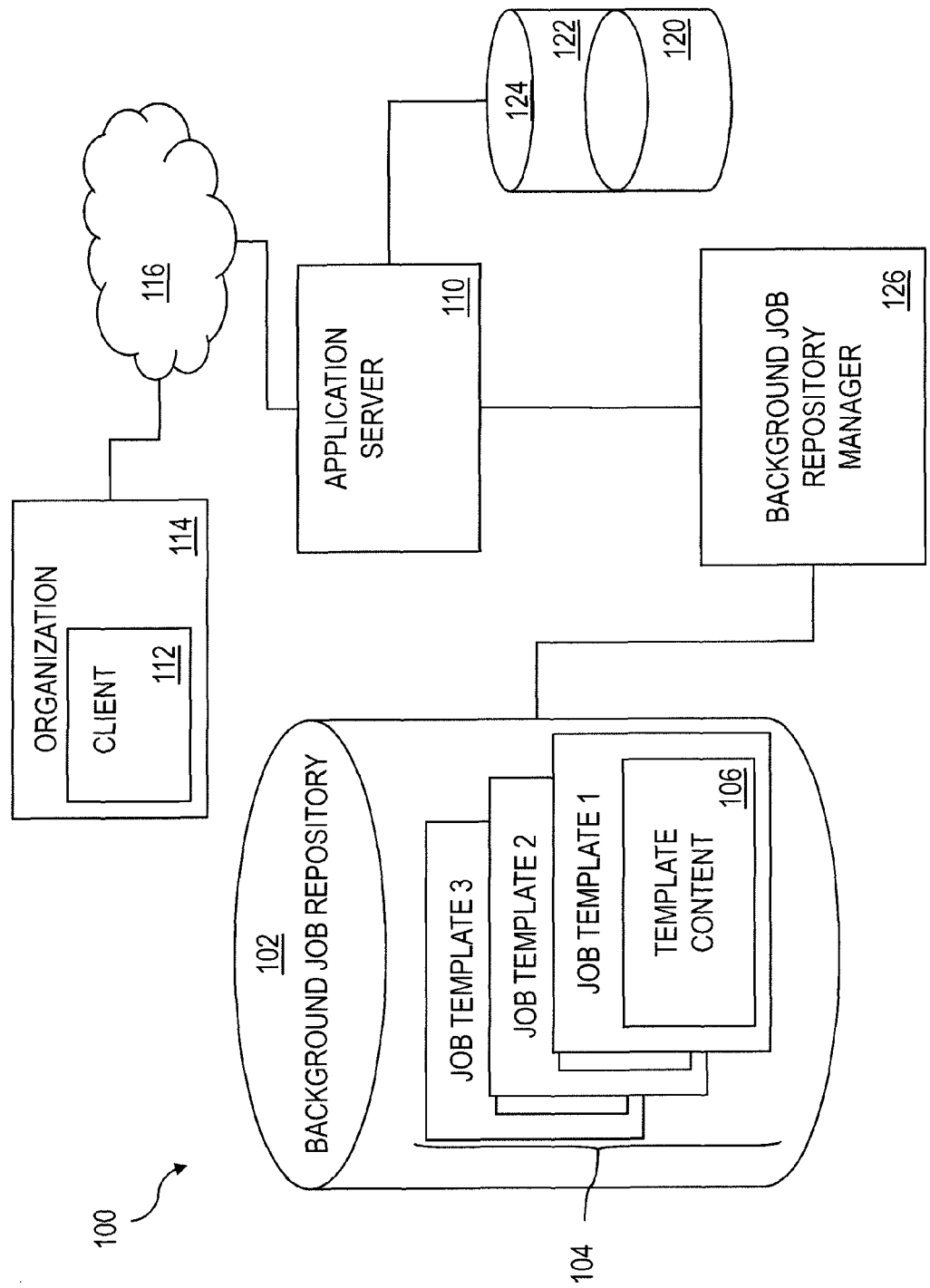
FIG. 1 is a diagram showing aspects of a background job repository in conjunction with an application server and background job manager.

To address these and potentially other issues with currently available solutions, one or more implementations of the current subject matter provide methods, systems, articles of manufacture, and the like that can, among other possible advantages, provide a database structure, referred to herein as a background job repository, that formalizes knowledge about which background maintenance tasks are required by a specific implementation of a customized software architecture by storing this information as machine-processable meta data. A list (which can be a simple list or some other more detailed database structure depending on the specific implementation) of potentially relevant background jobs can be maintained. This list can include information regarding what is to be executed (for example, a name or other designation of a program, script, variant, etc.), when is it to be executed (for example as instructions for a periodic-scheduler or event-handler), and where or under what conditions it is to be executed (for example which systems and/or client tenants should run the background job). This meta information can be provided in some implementations as a piece of code or other readily integrated and updated information that can be readily integrated into an existing background job repository to reflect changes required by a new installation or an update or upgrade process into existing installations. Once the meta information is in the system in the form of background job templates stored in a background job repository, the background job corresponding to each such background job template can be automatically generated, maintained, and modified at system-change events, such as for example updates, upgrades, after an installation, upon a change in scope of the functionality provided by a customer's current business configuration of the customized software architecture, and the like.

As all of the above-noted information can be stored in a machine-processable way, automated monitoring of active background jobs can be performed at runtime. In such an example, an ongoing "health check" can be performed to verify whether all relevant background jobs are actually running and to identify any unnecessary or outdated background jobs that are no longer required due to updates, configuration scope changes, or the like. Because each current background job should have a corresponding background job template in the background job repository, discrepancies between the background job templates in the background job repository and those background jobs that are actually running can be readily identified and corrected by making the running background jobs consistent with the background jobs described by the applicable background job templates from the background job repository. This "repair" or "healing" of the background jobs currently running in the system can be performed at runtime. As discussed in greater detail below, the current subject matter can also provide for modifications of both generic and tenant-specific content stored in a data repository of a multi-tenant system; remote changes of the stored content for one client tenant from a system management console, cloud-based architecture management system, or the like; creation and/or use of additional business-related background jobs that are specific to a business configuration of a specific client tenant; and scheduling of these background jobs for execution by one or more batch processes.

Implementations of the current subject matter can include establishing and/or maintaining a background job repository that enables intelligent, systematic, and simplified application of background jobs in a customized software delivery architecture. Periodic background jobs required to maintain operation of such a customized software delivery architecture can be standardized and kept up to date. At runtime, it can be ensured that pre-defined background jobs are run with a proper schedule and only for parts of the customized software delivery architecture for which the background jobs are designed and intended.

FIG. 1 shows a block diagram 100 of a computing architecture consistent with some implementations of the current subject matter. A background job repository 102 can include one or more background job templates 104 that each include template content 106. Optional features of the template content 106 are described in greater detail below. An application server 110 can include one or more processors and can provide access to a customized software solution to at least one client 112 at an organization 114. As noted above, the one or more processors can be located locally at the organization 114 or alternatively at a remote location where they are accessible over a communication network 116 as is shown in FIG. 1. The application server 110 provides access to generic content 120 and organization-specific content 122 that are stored in a content repository 124. The organization-specific content can include various customizations of a core software platform that are implemented to accommodate specific business processes of the organization 114.

A background job repository manager 126 that is in communication with the background job repository 102 and the application server 110 and/or the content repository 124 can perform consistency checks on actual background jobs running on the application server 110 and affecting the content repository 124. Such consistency checks can be performed upon occurrence of a specific event, such as for example installation of a new software feature or platform or an update or upgrade of an existing installation, or as a monitoring process that occurs continuously, semi-continuously, periodically, or the like. A consistency check can include reviewing the actually running background jobs at the application server 110 with the background job templates 106 stored in the background job repository 102. Specifically, the template content 106 of each background job template 106 can specify for a corresponding background job one or more of what the corresponding background job is and/or what tasks it performs, when the corresponding background job should be run, and what prerequisite features of the customized software solution should be present for the corresponding background job to be appropriate for running in the customized software solution. Currently active background jobs in the application server that correspond to a background job template 106 whose template content 106 lists prerequisite features that are not present in the customized software solution can be deactivated by the background job manager 126. Similarly, background jobs that are not currently running but that correspond to a background job template 106 whose template content 106 lists prerequisite features that are present in the customized software solution can be added by the background job manager 126 as active background jobs in the application server 110.

Figure 2:
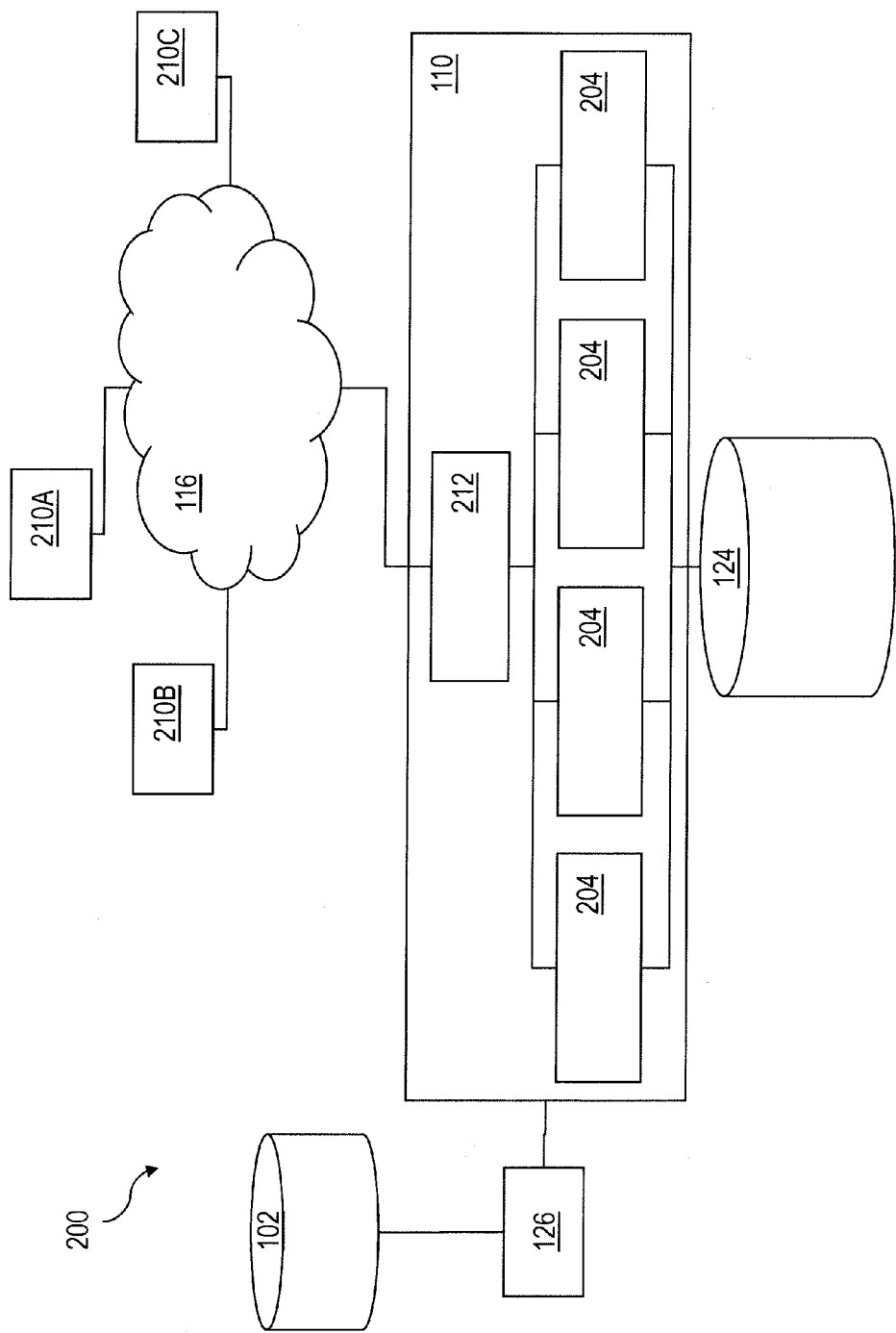
FIG. 2 is a diagram showing aspects of a multi-tenant software delivery architecture.

In a further implementation a background job repository 102 and background job manager 126 can be used to manage background jobs executing in a multi-tenant software architecture that provides multiple customized versions or a core software platform to multiple organizations via a plurality of client tenants. FIG. 2 shows a block diagram of a multi-tenant implementation of a software delivery architecture 200 that includes an application server 110, which can in some implementations include multiple server systems 204 that are accessible over a network 206 from client machines operated by users at each of multiple organizations 210A-210C (referred to herein as "client tenants" of a multi-tenant computing system) supported by a single software delivery architecture 200.

For a system in which the application server 110 includes multiple server systems 204, the application server can include a load balancer 212 to distribute requests and actions from users at the one or more organizations 210A-210C to the one or more server systems 204. A user can access the software delivery architecture across the network using a thin client, such as for example a web browser or the like, or other portal software running on a client machine. The application server 110 can access data and data objects stored in one or more data content repositories 124.

Figure 3:
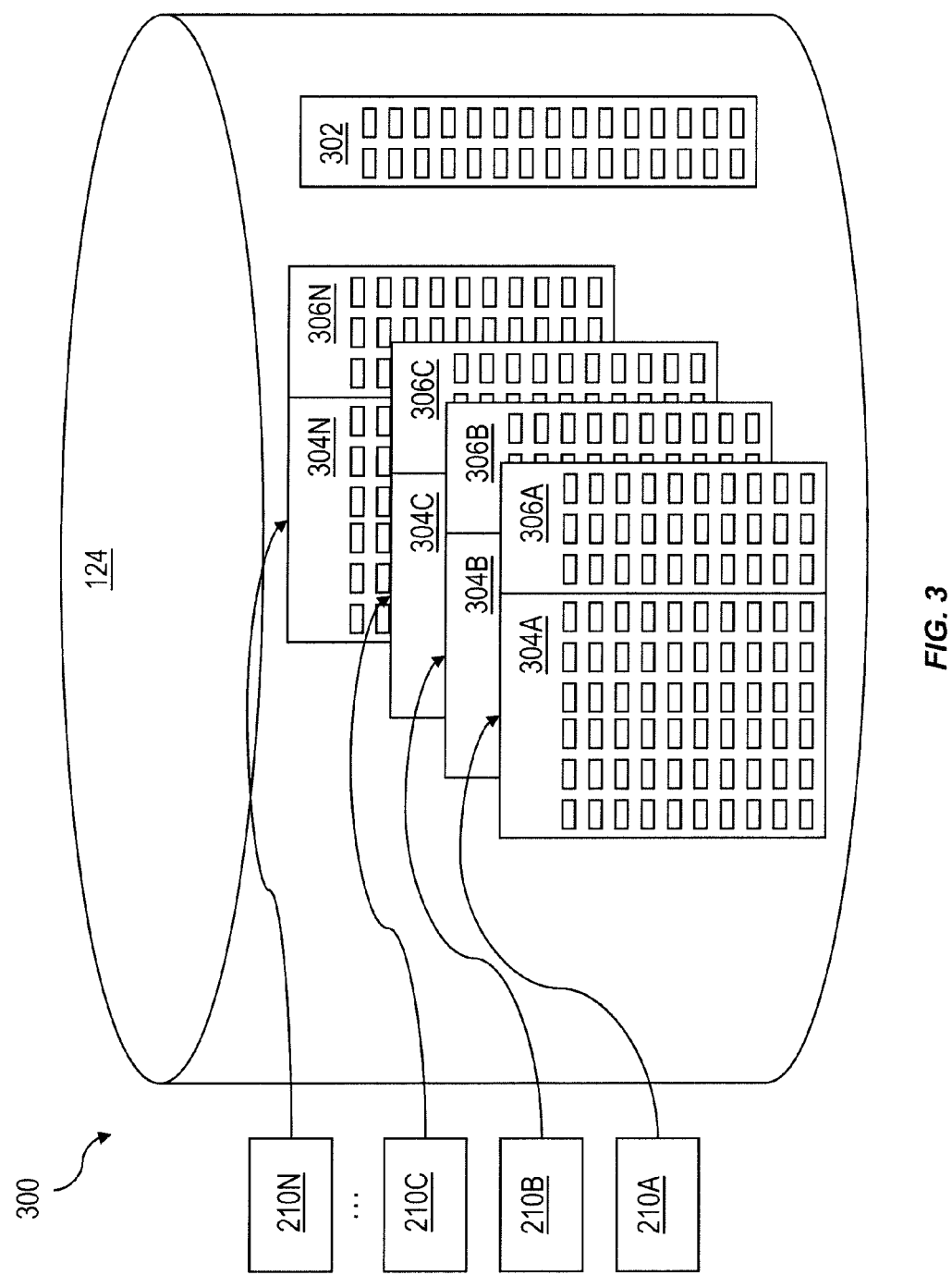
FIG. 3 is a diagram showing additional aspects of a multi-tenant software delivery architecture.

To provide for customization of the core software platform for each of multiple organizations supported by a single software delivery architecture 200, the data and data objects stored in the content repository or content repositories 124 that are accessed by the application server 110 can include three types of content as shown in FIG. 3: core software platform content 302, system content 304, and tenant-specific content 306. Core software platform content 302 includes content that represents core functionality and is not modifiable by a client tenant 210A-210N. Such content can also be referred to as generic content 120 as discussed above in regards to FIG. 1. System content 304 can in some examples be created by the runtime of the core software platform and can include core data objects that are modifiable with data provided by each client tenant 210A-210N. Such content can also be characterized as generic content 120 in that the specific data structures are not customizable by users other than system administrators. Only the data stored in the data structures are modifiable by end users at the organization. For example, if the core software platform is an enterprise resource planning (ERP) system that includes inventory tracking functionality, the system content 304A-304N can include data objects for labeling and quantifying inventory. The data retained in these data objects are specific to one client tenant 210A-210N, for example, each client tenant 210A-210N would store information about its own inventory.

Tenant-specific content 306A-306N can include data objects or extensions to other data objects that are customized for one specific client tenant 210A-210N to reflect business processes and data that are specific to the organization that is assigned to and that uses that specific client tenant 210A-210N and are accessible only to authorized users at the organization to which the client tenant 210A-210N is assigned. Such data objects can include a key field (for example "client" in the case of inventory tracking) as well as one or more of master data, business configuration information, transaction data or the like. For example, tenant-specific content 306 can include condition records in generated condition tables, access sequences, price calculation results, or any other tenant-specific values. A combination of the software platform content 302 and system content 304 and tenant content 306 of a specific tenant are presented to users from that tenant such that each tenant is provided access to a customized solution having data that is available only to users from that tenant.

Figure 4:
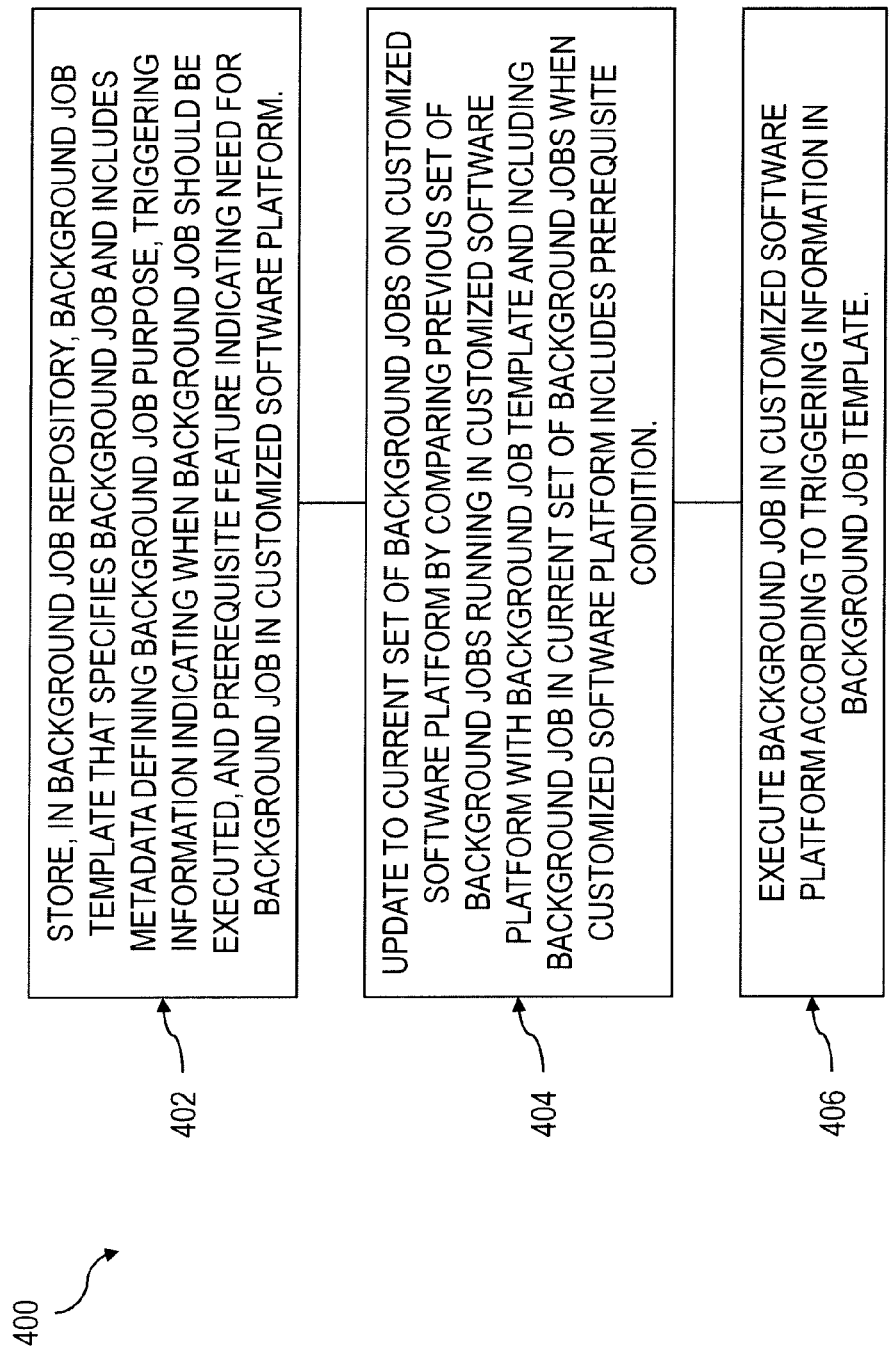
FIG. 4 is a process flow diagram illustrating aspects of a method consistent with implementations of the current subject matter.

In an implementation of the current subject matter, a method as shown in the process flow chart 400 of FIG. 4 provides for intelligent, automated maintenance of a current set of background jobs in an application server. At 402, a background job template 104 is stored in a background job repository, which as noted above can include multiple background job templates. The background job template 104 specifies, for example in its template content 106, a background job that includes a recurrent, event based, or one (or more) time non-recurrent maintenance task that is executable on or that otherwise affects a customized software platform provided from an application server 110. The background job template 104 can also include metadata defining a purpose of the background job, triggering information indicating when the background job should be executed, and one or more prerequisite features of the customized software platform. The one or more prerequisite features provide a criterion or criteria for determining that the background job is needed in the customized software platform. At 404, a previous set of background jobs that run in the customized software platform is updated to a current set of background jobs that run in the customized software platform. The updating includes comparing the previous set of background jobs with the background job template 104 and including the background job in the current set of background jobs when the customized software platform includes the prerequisite feature. Alternatively, if the previous set includes a background job whose corresponding background job template 104 includes one or more prerequisite features that are not currently present in the customized software platform, the background job can be deleted in the updating from the previous set to the current set. At 406, the background job is executed in the customized software platform according to the triggering information in its corresponding background job template 104.

In some variations that are within the scope of this disclosure, the template content 106 of a background job template 104 can include a background job description that defines execution steps as well as an execution schedule and one or more execution terms of a pre-defined background job that performs one or more background and/or maintenance tasks in a software system that delivers customized solutions to one or more organizations. Execution steps can include the actual procedures that the background job accomplishes when it is executed. An execution schedule for a background job can include recurrence information as well as scheduling exclusions. Recurrence information can specify how to schedule a background job. The date and time information can be explicitly modeled as a specific time, as a recurrence value (for example "Every 2 Days"), based on the occurrence of a triggering event in a tenant or system, or as a call from a predecessor job. A list of potential events can be pre-modeled as well so that a background job template can simply refer to a pre-defined event name. The event can be triggered by any piece of an application or system program. Events can include, but are not limited to system shutdown or startup, update or upgrade of software on a system, a status change of a specific application or object, reaction to a user input (such as for example a changed password, creation of an order, etc.).

A scheduling exclusion can define exceptions based on factors such as one or more system roles, tenant roles, landscape roles, and the like in which the background job should not be scheduled. A system role can define a main application, for example the core software package discussed elsewhere in this disclosure, that is running on a software system. For example, system roles can refer to those functions of the software system that are tenant-independent or those that could be characterized as a "pure" aspect of the core software platform. For example, in the case of a Netweaver™ installation (available from SAP AG of Walldorf Germany), system roles can be characterized as those attributable to a "pure Netweaver system." Similarly, in a ByDesign™ installation (also available from SAP AG of Walldorf Germany), system roles can be characterized as those attributable to a "pure ByDesign system." In other examples, a customized, standalone installation of an enterprise resource planning software or any other kind of specific add-on installation of a comparable software system can have system roles as discussed herein. A tenant role can generally refer to roles that are specific to a certain tenant of a multi-tenant system. For example, an administration tenant can be a tenant that is not used by customers but instead by a system administrator or by a third-party service provider that provides an external software solution that is wholly or partly integrated with a core software platform. Template master tenants can be used to build new customer tenants by copying the master template. Other tenants that have tenant roles can include productive customer tenants, development tenants that can in some examples be used for development of add-on software, test tenants that can be used by a customer to try out new features or new configurations on a copy of his/her productive tenant and production data, and trial tenants for prospective customers to sample the available features of the customizable software architecture. A landscape role can facilitate distinguishing a system used by a developer to develop the core software platform. One landscape role can be a trial system used for software and development validation by test and validation teams. Another can be a real production system landscape having tenants and systems for real customers.

Execution terms can include one or more roles and/or system characteristics as well as other job settings required to schedule a background job. For example, a background job can be designated for execution only in a productive tenant or only in a test tenant, or to have as its triggering event the completion by a predecessor background job of its execution. The completion of execution by the predecessor job can be include a successful execution of the task or tasks defined in the predecessor job or as a result of the predecessor job being aborted prior to completion, for example because of a failure in one or more or its defined tasks. A background job whose triggering event includes the completion of a predecessor job can include flags that define whether successful or unsuccessful completion of the tasks of the predecessor job is relevant to whether the background job should be executed.

Put another way, in optional variations, the background job template can include details pertaining to one or more of what should be executed. Examples of what should be executed can include the name of the program, variant, metadata object or business object, executable routine or scripts, or the like that are to be executed and one or more pre-defined parameters for the same. A variant can include a pre-definition of start parameters for an ABAP program. In this manner, the background job templates stored in the background job repository can include all of the information necessary to ensure that a background job to be scheduled automatically does not require any manual user input to run. Rather, all parameters of the program, etc. can be provided as parameters as part of the "what to execute" description, for example by listing the name of an ABAP program variant or by adding name-value lists for input parameters where the value actually could be either a static or a fixed default value or a reference to a calculation rule.

The background job template can also specify when the background job designated by the background job template should be executed (for example periodically in a defined interval, after one or more specific system events, as a call from another background job, or the like). One or more prerequisite features to apply the background job template can also be specified by the background job template. These prerequisite features can include, but are not limited to, system attributes (for example whether the system includes an unmodified version of the core software platform or one or more customizations or features available from an add-on or other third-party system), tenant attributes (for example whether the tenant is a test, productive, or trial tenant or the like), specific applications that are within the scope of the customized software solution supplied to the organization (for example which functionality the has been selected by the organization), and the like. The scope of the customized software solution can in some examples be described in the template abstract with reference to entities such as process components, business objects, business process variants, business features (which can in some examples include a configuration switch or flag), and the like, that bind a scope dependency of a background job template to one or more defined application entities. Thus, if the application entity referred to as a prerequisite feature in the background job template content is enabled in the scoping of a customized instance of the software platform (in scoping), the background job referenced by the background job template can be enabled for that customized installation. One or more scope dependency logical statements can be combined as an expression of prerequisite features for enablement of a background job defined by a background job template.

According to one or more implementations, the customized software platform can be monitored, either semi-continuously, periodically, at system start-up or shutdown, or the like. The monitoring can include determining the consistency of those background jobs that are actually running in the architecture with the background job templates in the background job repository that have prerequisite features and/or other features indicating that they should be included in the architecture.

The background job template for each background job can be employed as an additional source of information for support in case a running job experiences an error or otherwise encounters or creates a trouble condition. For example, one or more attributes that indicate an error or trouble condition can be specified by the background job template. Such attributes can include, for example, total time, number of processor cycles, or the like that are expected to complete an execution of the background job; requirement for an automatic restart after failure of the background job to fully execute; and the like.

A background job template can also provide one or more details of activation and re-activation events that can be used to trigger execution of the corresponding background job. Examples of activation or re-activation events can include, but are not limited to, after installation of new software, after system software changes such as upgrades or updates (such upgrade or update changes can optionally be referred to as "after-import"), after changes of selected application scope (such scope changes can optionally be referred to as "after-deployment"), after changes of one or more key tenant attributes (for example after moving or copying of a tenant)

In a multi-tenant system that supports multiple client tenants on a single application server (which can optionally include multiple processors joined by a load balancer), background jobs can be scheduled in different ways in the client tenants based on agreement of each specific client tenant with the prerequisite features (for example tenant attributes, scope selection, and other examples as discussed above) specified in each background job template in the background job repository. Background jobs can optionally be temporally distributed, such as for example with a time offset or the like, so that not all jobs are running in all client tenants at exactly the time specified in the background job template. A background job template can optionally include a different delay that is used depending on an identification label for each client tenant.

In an illustrative example, if the client tenants are labeled with assigned Arabic numerals, a background job template can specify that odd numbered client tenants use a 2 minute (or some other period of time) delay for execution of the specified background job while even numbered tenants use no delay. A background job template can be created or modified directly in an application software system, for example either locally or via remote access and either for all tenants or for a specific tenant. Alternatively, a background job template can be created or edited by one or more software developers in a development system or development repository for inclusion as part of a software delivery process. For example, a new or edited background job template can be automatically added as part of a software installation. During a software change such as an updates, upgrade, or the like, one or more additional background job templates can be added, and existing background job templates can be removed or changed. The background job repository and its job repository manager can be integrated into installation, upgrade, update, and the like processes so that the job repository manager can automatically analyze the background job templates provided by the software manufacturer and decide to adopt the job scheduling of the system or tenant accordingly. In a multi-tenant system, the prerequisite feature can optionally include one or more of a first attribute of the core software platform, a second attribute of a specific client tenant of the plurality of client tenants, and a tenant-specific scope of functionality provided to the organization by a specific client tenant of the plurality of client tenants.

In some implementations, a change of job scheduling can always be related to receipt of a job template, such as for example via delivery of a software update, upgrade, new installation, or the like. Such a delivery process can support or include the tasks of changing an existing background job template and adopt background job scheduling as well as deleting a background job template and, as a follow-up, immediately removing the scheduled background job or jobs corresponding to the deleted background job template.

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer program product comprising a non-transitory machine-readable medium storing instructions that, when executed by at least one processor, cause the at least one processor to perform operations comprising:
    storing a background job template in a background job repository, the background job template specifying a background job comprising:
        a maintenance task executable by a customized software platform provided by an application server,
        metadata defining a purpose of the background job,
        triggering information indicating when the background job should be executed, and
        at least one prerequisite feature of the customized software platform indicating a need for the background job in the customized software platform;
    updating to a current set of background jobs executable in the customized software platform, the updating comprising comparing a previous set of background jobs executing in the customized software platform with the background job template and including the background job in the current set of background jobs when the customized software platform includes the at least one prerequisite feature; and
    executing the background job in the customized software platform according to the triggering information in the background job template.

2. A computer program product as in claim 1, wherein the operations further comprise:
    receiving, as part of an new software installation or a change to an existing software installation at the application server, at least one of a second background job template and a change to the background job template; and
    performing at least one of storing the second background job template in the background job repository, and making the change to the background job template in the background job repository.

3. A computer program product as in claim 1, wherein the operations further comprise:
  periodically monitoring the customized software platform to determine whether changes to the customized software platform have resulted in the customized software platform no longer having the at least one prerequisite feature or have resulted in the customized software platform having a second prerequisite feature of a second background job template specifying a second background job that is not part of the current set;
  removing the background job from the current set if the customized software platform no longer has the at least one prerequisite feature; and
  adding the second background job to the current set if the customized software platform has the second prerequisite feature.

4. A computer program product as in claim 1, wherein the customized software platform is provided via a client tenant of a plurality of client tenants of a multi-tenant software architecture implemented on the application server, the application server being accessible over a network from a plurality of organizations that are each provided access to one of the plurality of client tenants, at least one of the plurality of client tenants comprising different functionality than the customized software platform.

5. A computer program product as in claim 4, wherein the application server accesses at least one data repository that comprises:
  core software platform content relating to the operation of the multi-tenant software architecture, the core software content being common to all of the plurality of tenants and unmodifiable by users at the organizations;
  system content comprising data objects created in runtime by the multi-tenant software architecture that are modifiable with data provided by a corresponding tenant; and
  tenant-specific content including data objects or extensions to data objects that are customized for a corresponding tenant, wherein data objects or extensions to data objects of a particular tenant are not available to other tenants.

6. A computer program product as in claim 4, wherein the prerequisite feature comprises at least one of a first attribute of the core software platform, a second attribute of a specific client tenant of the plurality of client tenants, and a tenant-specific scope of functionality provided to the organization by a specific client tenant of the plurality of client tenants.

7. A computer program product as in claim 1, wherein the background job template comprises an execution step for the background job as well as an execution schedule and an execution term for the background job.

8. A computer program product as in claim 1, wherein the operations further comprise:
  receiving a new background job template for addition to the background job repository, the receiving being associated with an installation of new functionality in the customized software platform or with an update or upgrade to the customized software platform; and
  updating the current set of background jobs running in the customized software platform to a new current set of background jobs running in the customized software platform such that the new set includes a new background job defined by the new template if the customized software platform includes a new prerequisite feature that the new background job template comprises.

9. A computer-implemented method comprising:
  storing a background job template in a background job repository that comprises a non-transitory computer-readable storage medium, the background job template specifying a background job comprising:
    a maintenance task executable by a customized software platform provided by an application server,
    metadata defining a purpose of the background job,
    triggering information indicating when the background job should be executed, and
    at least one prerequisite feature of the customized software platform indicating a need for the background job in the customized software platform;
  updating to a current set of background jobs executable in the customized software platform, the updating comprising comparing a previous set of background jobs executing in the customized software platform with the background job template and including the background job in the current set of background jobs when the customized software platform includes the at least one prerequisite feature; and
  executing the background job in the customized software platform according to the triggering information in the background job template.

10. A computer-implemented method as in claim 9, further comprising:
  receiving, as part of an new software installation or a change to an existing software installation at the application server, at least one of a second background job template and a change to the background job template; and
  performing at least one of storing the second background job template in the background job repository, and making the change to the background job template in the background job repository.

11. A computer-implemented method as in claim 9, further comprising:
  periodically monitoring the customized software platform to determine whether changes to the customized software platform have resulted in the customized software platform no longer having the prerequisite feature or have resulted in the customized software platform having a second prerequisite feature of a second background job template specifying a second background job that is not part of the current set;
  removing the background job from the current set if the customized software platform no longer has the prerequisite feature; and
  adding the second background job to the current set if the customized software platform has the second prerequisite feature.

12. A computer-implemented method as in claim 9, wherein the customized software platform is provided via a client tenant of a plurality of client tenants of a multi-tenant software architecture implemented on the application server, the application server being accessible over a network from a plurality of organizations that are each provided access to one of the plurality of client tenants, at least one of the plurality of client tenants comprising different functionality than the customized software platform.

13. A computer-implemented method as in claim 12, wherein the application server accesses at least one data repository that comprises:
  core software platform content relating to the operation of the multi-tenant software architecture, the core software content being common to all of the plurality of tenants and unmodifiable by users at the organizations;
  system content comprising data objects created in runtime by the multi-tenant software architecture that are modifiable with data provided by a corresponding tenant; and tenant-specific content including data objects or extensions to data objects that are customized for a corresponding tenant, wherein data objects or extensions to data objects of a particular tenant are not available to other tenants.

14. A computer-implemented method as in claim 12, wherein the prerequisite feature comprises at least one of a first attribute of the core software platform, a second attribute of a specific client tenant of the plurality of client tenants, and a tenant-specific scope of functionality provided to the organization by a specific client tenant of the plurality of client tenants.

15. A computer-implemented method as in claim 9, wherein the background job template comprises an execution step for the background job as well as an execution schedule and an execution term for the background job.

16. A computer-implemented method as in claim 9, further comprising:
receiving a new background job template for addition to the background job repository, the receiving being associated with an installation of new functionality in the customized software platform or with an update or upgrade to the customized software platform; and
updating the current set of background jobs running in the customized software platform to a new current set of background jobs running in the customized software platform such that the new set includes a new background job defined by the new template if the customized software platform includes a new prerequisite feature that the new background job template comprises.

17. A system comprising:
computer hardware comprising at least one programmable processor; and
a machine-readable medium storing instructions that, when executed by the at least one programmable processor, cause the at least one programmable processor to perform operations comprising:
storing a background job template in a background job repository, the background job template specifying a background job comprising:
a maintenance task executable by a customized software platform provided by an application server,
metadata defining a purpose of the background job,
triggering information indicating when the background job should be executed, and
at least one prerequisite feature of the customized software platform indicating a need for the background job in the customized software platform;
updating to a current set of background jobs executable in the customized software platform, the updating comprising comparing a previous set of background jobs executing in the customized software platform with the background job template and including the background job in the current set of background jobs when the customized software platform includes the at least one prerequisite feature; and
executing the background job in the customized software platform according to the triggering information in the background job template.

18. A system as in claim 17, wherein the operations further comprise:
receiving, as part of an new software installation or a change to an existing software installation at the application server, at least one of a second background job template and a change to the background job template; and
performing at least one of storing the second background job template in the background job repository, and making the change to the background job template in the background job repository.

19. A system as in claim 17, wherein the operations further comprise:
periodically monitoring the customized software platform to determine whether changes to the customized software platform have resulted in the customized software platform no longer having the prerequisite feature or have resulted in the customized software platform having a second prerequisite feature of a second background job template specifying a second background job that is not part of the current set;
removing the background job from the current set if the customized software platform no longer has the prerequisite feature; and
adding the second background job to the current set if the customized software platform has the second prerequisite feature.

20. A system as in claim 17, wherein the operations further comprise:
receiving a new background job template for addition to the background job repository, the receiving being associated with an installation of new functionality in the customized software platform or with an update or upgrade to the customized software platform; and
updating the current set of background jobs running in the customized software platform to a new current set of background jobs running in the customized software platform such that the new set includes a new background job defined by the new template if the customized software platform includes a new prerequisite feature that the new background job template comprises.

* * * * *